United States Patent [19]

Murai et al.

[11] Patent Number: 4,947,048

[45] Date of Patent: Aug. 7, 1990

[54] STEREOSCOPIC PHOTOGRAPHIC MEASURING DEVICE

[75] Inventors: Shunji Murai, Hachio; Akishige Shirasawa, Tokyo, both of Japan

[73] Assignee: Kabushiki Kaisha Topcon, Tokyo, Japan

[21] Appl. No.: 372,608

[22] Filed: Jun. 28, 1989

[30] Foreign Application Priority Data

Jun. 29, 1988 [JP] Japan .................................. 63-161895

[51] Int. Cl.⁵ .............................................. G01C 11/12
[52] U.S. Cl. ...................................... 250/558; 356/12
[58] Field of Search ................... 250/558; 356/12, 13, 356/14; 358/88

[56] References Cited

U.S. PATENT DOCUMENTS

| | | | |
|---|---|---|---|
| 4,601,053 | 7/1986 | Grumet | 250/558 |
| 4,724,526 | 2/1988 | Cole | 250/558 |

*Primary Examiner*—David C. Nelms
*Assistant Examiner*—Sherrie Hsia

*Attorney, Agent, or Firm*—Brumbaugh, Graves, Donohue & Raymond

[57] ABSTRACT

A stereoscopic photographic measuring device which can execute an analysis of a stereoscopic photograph very efficiently. The stereoscopic photographic measuring device comprises a table for receiving a set of stereoscopic photographs thereon, and an optical system body constructed for movement in two-dimensional directions relative to the table. The table has a plane coordinate reading means provided thereon for reading coordinates of the stereoscopic photographs while the optical system body has provided thereon a stereoscope unit for observing the stereoscopic photographs in a stereoscopic vision, first and second cursors disposed within a range wherein the first and second cursors can be observed by way of the stereoscope unit, and a distance adjusting means for adjusting a distance between the first and second cursors. The device further comprises an outputting means for outputting data read in by the first cursor and the plane coordinate reading means and data read in by the second cursor and the plane coordinate reading means to a data processing device.

3 Claims, 3 Drawing Sheets

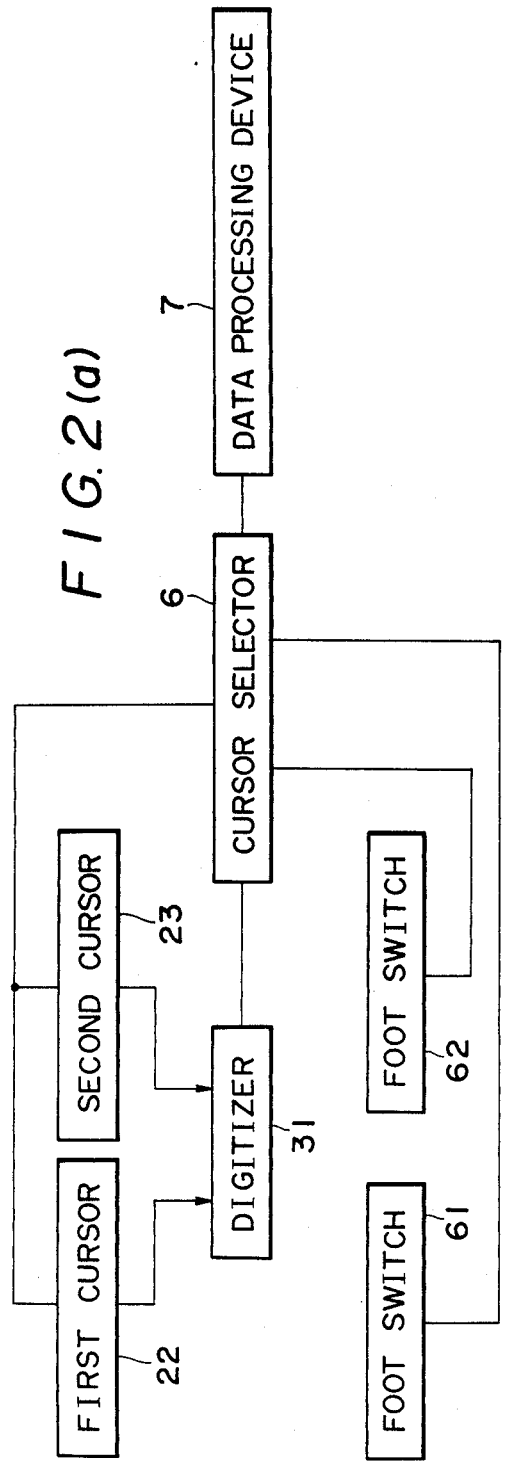
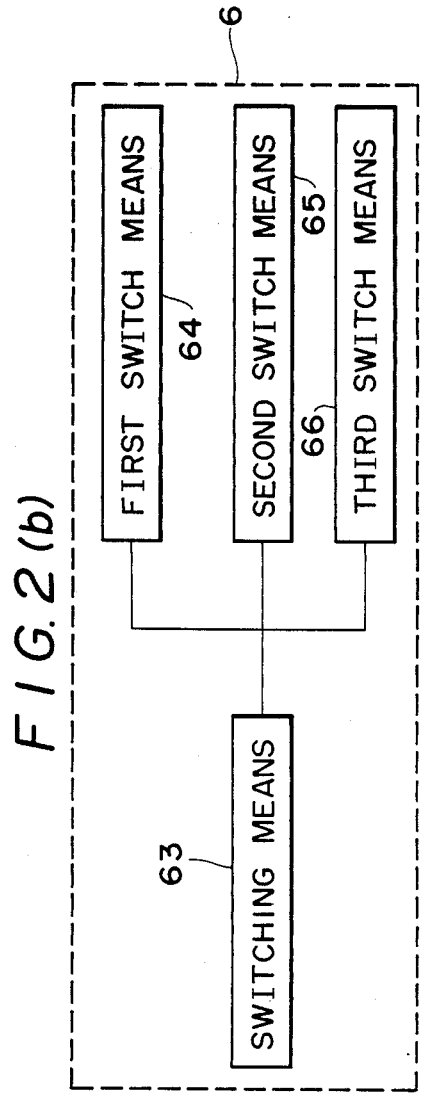
FIG. 2(a)
FIG. 2(b)

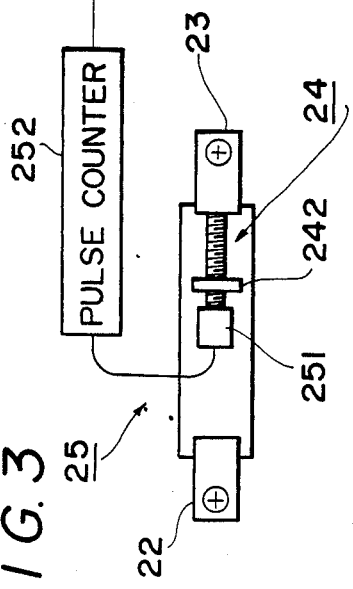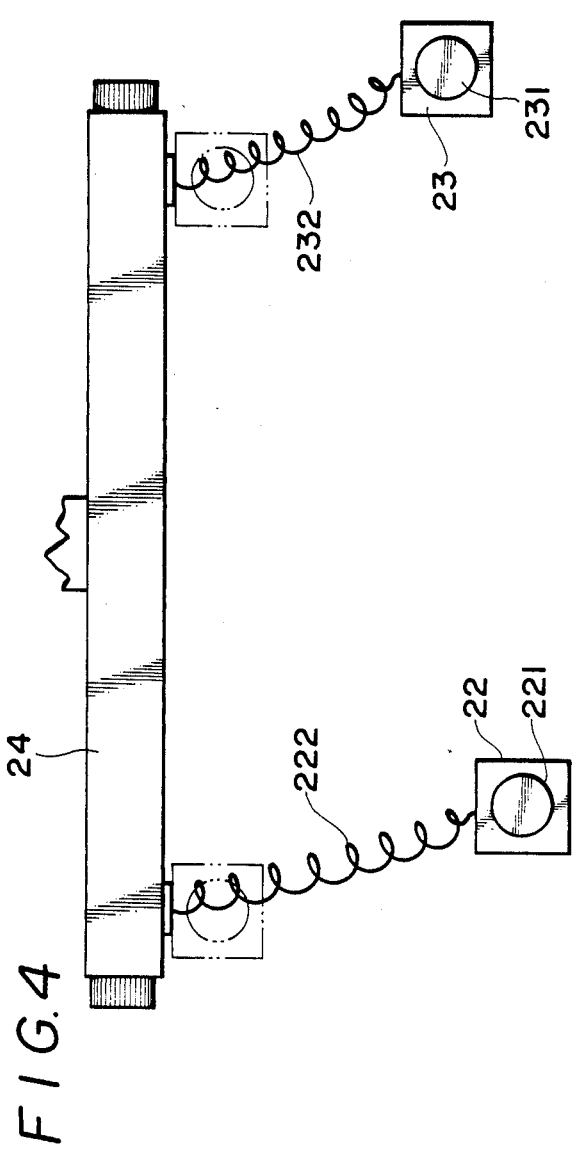

STEREOSCOPIC PHOTOGRAPHIC MEASURING DEVICE

BACKGROUND OF THE INVENTION

This invention relates to a stereoscopic photographic measuring device for calculating a three-dimensional position, a height or the like making use of a set of stereoscopic photographs (stereo photographs), and more particularly to a stereoscopic photographic measuring device wherein a stereoscope unit and two cursors are integrated with one another and constructed for movement at a time in two-dimensional directions in order that coordinate data or the like may be delivered readily to a data processing device.

Conventionally, a measuring device called precision patterning machine is required in order to find out three-dimensional coordinates from a set of stereoscopic photographs. The precision patterning machine is constituted such that a positive film is set on a drive table and a stereoscopic image is observed with rotation of a projector adjusted exactly in order to find out three-dimensional coordinates. However, such precision patterning machine is very expensive, and because a positive film is required in addition to the requirement for a skilled technique of operation, there is a problem that a common printed photograph cannot be used. In view of such problems of the precision patterning machine as described just above, a simple photographic measuring system has been developed which includes a digitizer, double cursors, a stereoscope unit and a small size calculator and wherein a stereoscopic photograph is observed in a stereoscopic vision to read plane coordinates of the photograph and the plane coordinates thus read are processed to calculate three-dimensional coordinates. (Japanese Utility Model Laid-Open No. 63-39618)

In the simple photographic measuring system, the reflecting stereoscope unit and the double cursors are formed as separate members and the reflecting stereoscope is supported on a movable arm while the double cursors are mounted for sliding movement on a support bar. Accordingly, the reflecting stereoscope unit and the double cursors have a construction wherein they can be moved freely on the digitizer, but they do not move in a mutually associated relationship but can change their positions independently of each other.

However, the conventional simple photographic measuring system described above does not have a construction wherein the reflecting stereoscope unit and the double cursors do not move in a mutually associated relationship. Accordingly, when a measuring operation is to be performed, at first the reflecting stereoscope unit is positioned at a position corresponding to a point of measurement, and then, while looking through the reflecting stereoscope unit at the position, relative positions of a set of stereoscopic photographs are moved to adjust such that a stereoscopic vision may be attained. Further, an index of one of the cursors must be adjusted to the point of measurement and an index of the other cursor must be made coincide with the index of the one cursor. When a stereoscopic photographic measurement is to be performed, normally a data processing for a large number of points of measurement is required, and with the photographic measuring system, such a measuring operation as described above must be repeated for each reading of data. A repetition of such operations not only deteriorates the operation efficiency remarkably but also makes a cause of an error in measurement. Further, when altitude differences or contour lines are to be produced from a stereoscopic photograph, there is no necessity of reading coordinates but there is the necessity of reading a distance between the two cursors. However, while the stereoscopic photographic measuring system of the conventional type described above includes a mechanism for adjusting the distance between the two cursors, it does not include a device for electrically measuring such distance. Therefore, the distance between the two cursors must necessarily be measured by visual observation of an operator. Accordingly, the conventional stereoscopic photographic measuring system has drawbacks that the operation efficiently is low and that an error in measurement or the like is brought about.

BRIEF DESCRIPTION OF THE DRAWINGS

The drawings show an embodiment of the present invention, and

FIG. 2(a) is a view illustrating a construction of the present embodiment;

FIG. 2(b) is a view illustrating a construction of a cursor selector;

FIG. 3 is a view illustrating a construction of a cursor distance detecting means; and FIG. 4 is a view illustrating a movable cursor.

DESCRIPTION OF THE INVENTION

Figure 1:
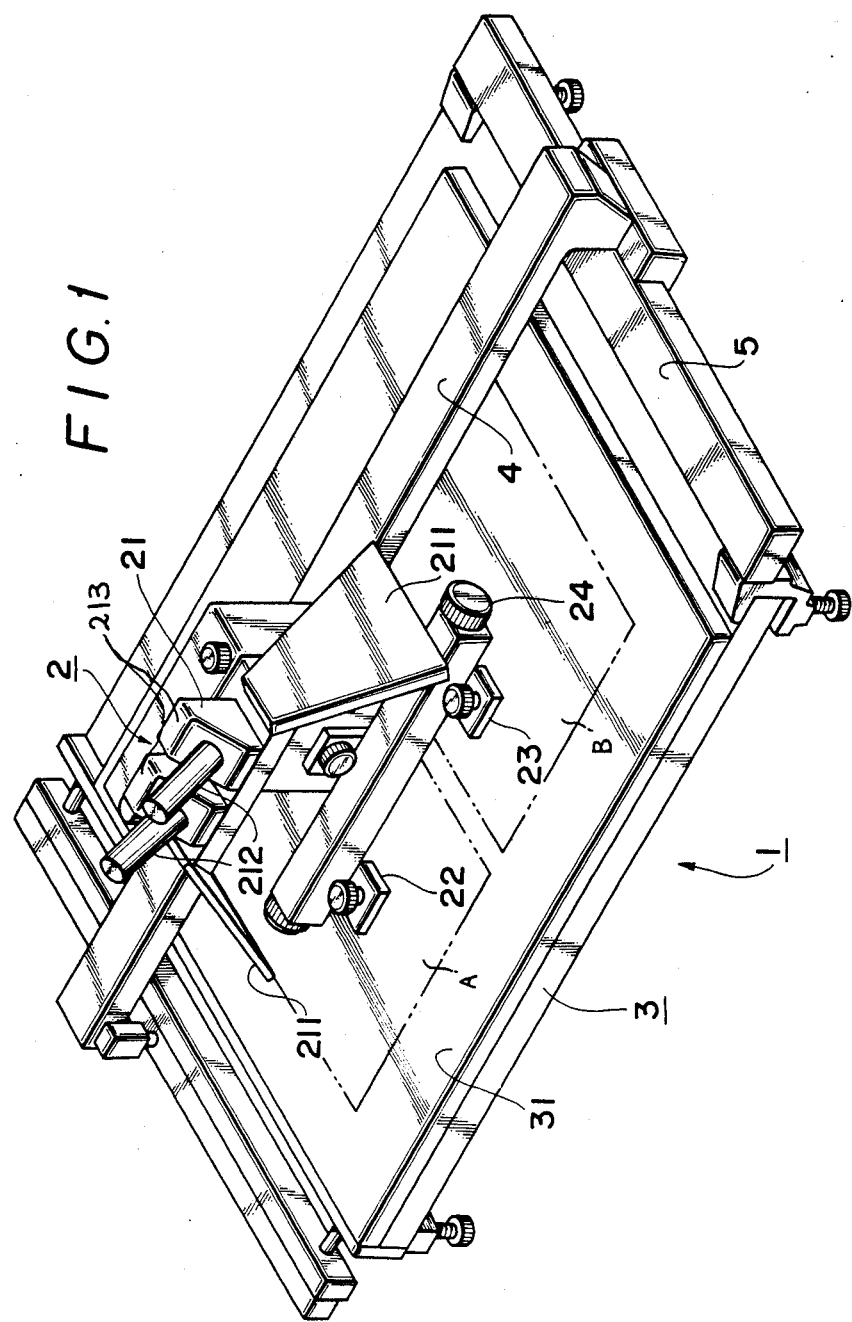
FIG. 1 is a perspective view showing an outline of the present embodiment.

An embodiment of the present invention will be described with reference to the drawings. FIG. 1 is a perspective view showing essential part of the present embodiment. Reference numeral 1 denotes a stereoscopic photographic measuring device body, which is composed of an optical system body 2 and a table body 3. The optical system body 2 is composed of a stereoscope unit 21, a first cursor 22, and a second cursor 23. A digitizer 31 is formed on the table body 3. The stereoscope unit 21 includes a pair of stereoscopes 211, a pair of stereo eyepieces 212 and a pair of prisms 213, and a stereoscopic photograph can be observed in a stereoscopic vision by the stereoscope unit 21. Each of the first cursor 22 and the second cursor 23 has an index, and at least one of the indexes is constructed as a movable index. The table body 3 is adapted to receive a set of stereoscopic photographs A and B thereon, and the digitizer 31 serving as a plane coordinate reading means for reading coordinates of the stereoscopic photographs A and B is formed on the table body 3. The optical device body 2 is fitted for sliding movement on a lateral running beam 4 and can be slidably moved in leftward and rightward lateral directions on the lateral running beam 4. Further, the lateral running beam 4 is fitted for sliding movement on a longitudinal running beam 5 and can be slidably moved in upward and downward longitudinal directions on the longitudinal running beam 5. Accordingly, the optical system body 2 mounted on the lateral running beam 4 can be moved in two-dimensional directions on the table body 3. Further, a distance adjusting means 24 is formed for adjusting the distance between the first cursor 22 and the second cursor 23, and a cursor distance detecting means 25 for measuring such distance is built in the distance adjusting means 24. Meanwhile, a cursor selector 6 is mounted in the present embodiment as shown in FIG. 2(a). The cursor selector 6 serves as an outputting means for outputting to a data processing device plane coordinate data detected by the first cursor 22 or the second cursor 23 and the digitizer 31. Accordingly, the first and second cursors 22 and 23 and the digitizer 31 are connected to the input side of the cursor selector 6 while a data processing device 7 constituted from a personal computer or the like is connected to the output side of the cursor selector 6. Then, two foot switches 61 and 62 are mounted on the cursor selector 6 so that an external signal may be delivered to the cursor selector 6. The cursor selector 6 has three kinds of switch means built therein as shown in FIG. 2(b) such that any of the switch means 64, 65 and 66 may be selected by a switching means 63. If the switching means 63 is set to the first switch means 64, then an output signal of the digitizer 31 by the first cursor 22 or the second cursor 23 can be changed over so that it may be forwarded to the data processing device 7. In particular, while digitizer 31 can read coordinates of either one of the stereoscopic photographs A and B, it must necessarily be recognized for data processing from which one of the stereoscopic photographs A and B the coordinates originate. Thus, when coordinates of the photograph A are to be read in, an observer will treadle the foot switch 61, but when coordinates of the photograph B are to be read in the observer will treadle the foot switch 62. Consequently, coordinate data of a desired one of the photographs can be forwarded to the data processing device 7. It is to be noted that the switch means 64, 65 and 66 are not limited to the foot switches 61 and 62 but may be any switch means. Subsequently, if the switching means 63 is set to the second switch means 65, then if either one of the foot switches 61 and 62 is treadled, an output signal of the digitizer 31 by the first cursor 22 or the second cursor 23 can be outputted in an alternate relationship. In particular, when the foot switch 61 or 62 is treadled, for example, for the even numbered time, data originating from the first cursor 22 can be outputted, but when the foot switch 61 or 62 is treadled for the odd numbered time, data originating from the second cursor 23 can be outputted. Naturally, such outputting relationship may be reversed for the even numbered time and for the odd numbered time. Further, if the switching means 63 is set to the third switch means 66, then if either one of the foot switches 61 and 62 is treadled, both of output signals of the digitizer 21 by the first cursor 22 and the second cursor 23 can be outputted continuously or at the same time. It is to be noted that also an output signal of the cursor distance detecting means 25 formed in the distance adjusting means 24 may be forwarded to the cursor selector 6. Then, the cursor selector 6 is desirably constructed to transmit a coordinate signal from the digitizer 31 to the data processing device 7 by means of a serial interface such as an RS-232C serial interface or the like. It is to be noted that the transmission system is not limited to RS-232C, and RS-422, a 20 mA current loop, or else a GPIB interface for parallel transmission or the like may be adopted. Further, the distance adjusting means 24 for adjusting the distance between the first cursor 22 and the second cursor 23 is composed of a screw section 241 and an adjusting knob 242 as shown in FIG. 3, and as the adjusting knob 242 is turned, the screw section 241 is turned so that the second cursor 23 is moved in a lateral direction. The cursor distance detecting means 25 is connected to the distance adjusting means 24. The cursor distance detecting means 25 in the present embodiment is composed of an encoder 251 and a pulse counter 252. In particular, the encoder 251 such as a rotary encoder converts a change in distance between the first cursor 22 and the second cursor 23 into a pulse signal, and such pulses are counted by the pulse counter 252 to detect a distance between the cursors. Meanwhile, the first cursor 22 and the second cursor 23 can be moved independently of each other relative to the table body 3 as shown in FIG. 4. Normally, detection of plane coordinates by the first and second cursors 22 and 23 and the digitizer 31 is performed such that magnetic fields are generated by coils 221 and 231 formed on the first and second cursors 22 and 23, respectively, and the magnetic fields are detected by the digitizer 31. Accordingly, by connecting extendible cords 222 and 232 to the coils 221 and 231, respectively, the first and second cursors 22 and 23 which can be moved independently of each other can be realized. It is to be noted that, where the first and second cursors are moved independently of each other to perform a measurement, it is desirable to set the switching means 63 of the cursor selector 6 to the first switch means 64 and treadle the foot switch 61 or 62 to read data originating from the first or second cursor 22 or 23.

Subsequently, a manner of use of the stereoscopic photographic measuring device of the present embodiment will be described. At first, a set of stereoscopic photographs are placed onto the table body 3. The left-hand side stereoscopic photograph A is first positioned so that it may extend substantially in parallel to the digitizer 31. Then, while looking through the stereoscope unit 31, the right-hand side stereoscopic photograph B is placed so as to obtain a stereoscopic vision.

Then, after completion of the placement of the stereoscopic photographs A and B, at first an internal standardization is executed. Such internal standardization involves adjustment of the principal point of the stereoscopic photographic measuring device to the principal point of the photographs and adjustment of the focal length of the stereoscopic photographic measuring device to the focal length of a camera. In particular, two-dimensional coordinates (mechanical coordinates) which have the origin and the axes of coordinate fixed to the digitizer 31 are converted into two-dimensional coordinates (mechanical coordinates) which have a reference at coordinate values provided to the indexes. More particularly, mechanical coordinates such as the indexes, gratings and four sides are measured by the digitizer 31, and such measured values are used in a calculation for an internal standardization by the data processing device 7.

After completion of such standardization, coordinates of a reference point are measured by the digitizer 31 while observing the stereoscopic photographs A and B in a one-eye vision or in a stereoscopic vision. Then, coordinates of the reference point on the ground are inputted to the data processing device 7 by way of a keyboard in order to execute a standardization calculation to find out three-dimensional coordinates.

Then, the switching means 63 of the cursor selector 6 is set to the third switch means 66, and a stereoscopic corresponding point to a point to be measured is found out making use of the first cursor 22 and the second cursor 23, whereafter the foot switch 61 is treadled. As a result, coordinates of the photograph A measured by the first cursor 22 are transmitted to the data processing device 7, and then, coordinates of the photograph B measured by the second cursor 23 are transmitted to the data processing device 7. It is to be noted that, in this instance, operation will be the same even if the foot switch 62 is treadled. In particular, in order to execute a measurement, it is necessary to adjust the index of the first cursor 22 to the point of measurement while looking through the stereo eyepieces 212 and then to turn and adjust the adjusting knob 242 such that the index of the second cursor 23 may coincide with the index of the first cursor 22. If the coordinates are read in this condition, then the data processing device 7 can calculate three-dimensional coordinates of the point of measurement from the two-dimensional coordinates of the photograph A, the two-dimensional coordinates of the photograph B and the data of the reference point. The measurer will then move the optical system body 2 to a next point of measurement, and a similiar measurement will be repeated. It is to be noted that, since the stereoscope unit 21 and the first and second cursors 22 and 23 move in an integral relationship, there is no necessity of performing an adjustment for a stereoscopic vision at the next point of measurement. Accordingly, if a stereo corresponding point to a next point of measurement is determined and then either one of the foot switches 61 and 62 is treadled, then a measurement can be repeated successively. It is to be noted that the first switching means 65 or the second switching means 66 may be utilized for the switching means 63 of the cursor selector 6.

While in the embodiment described above three-dimensional coordinates of an arbitrary point of measurement are calculated, there are some cases wherein only an altitude difference is required. For example, a height of a building or an altitude difference between a mountain and a ravine is required in some cases. The altitude difference is given by the following equation:

$$h = H/b \, P$$

where H is a photographing altitude, b a base length of a photograph, and P a difference in parallax error on the photograph.

Accordingly, at a point of measurement, only a parallax error on the photograph must be found out, and two-dimensional coordinates need not be found out. Accordingly, it is necessary to forward a difference in parallax error of the point of measurement to the data processing device 7. Thus, the present embodiment is constructed such that a difference in parallax error of a point of measurement can be automatically read in by the cursor distance detecting means 25 shown in FIG. 3. In particular, if the index of the first cursor 22 is made coincide with a point of measurement and then the adjusting knob 242 is turned to make the index of the second cursor 23 coincide with the index of the first cursor 22, then the encoder 251 is rotated together with such turning of the adjusting knob 242 so that a distance between the cursors can be detected. Output pulses of the encoder 251 are counted by the pulse counter 252 and are forwarded to the data processing device 7. If the optical system body 2 is moved and a similar operation is performed at a next point of measurement, then altitude differences (specific altitude differences) can be calculated successively. It is to be noted that, if the optical device body 2 is moved above the stereoscopic photographs 22 and 23 while maintaining the distance between the first cursor 22 and the second cursor 23 fixed, then stereo corresponding points of the indexes of the first and second cursors 22 and 23 all make an equal altitude, and if a plurality of points are successively specified, then a contour line can be drawn.

With the stereoscopic photographic measuring device of the present embodiment having such a construction as described above, three-dimensional data and so forth calculated by the data processing device 7 can be stored into an external storage device such as a floppy disk or a hard disk and further can be drawn by an X-Y plotter, a display unit or the like. Further, while the optical system body 2 is required to have such a construction that the stereoscope unit 21 and first and second cursors 22 and 23 can be moved in an integral relationship, the stereoscope unit 21 and the first and second cursors 22 and 23 are preferably constructed such that they can be removably mounted on each other, and besides it is an economical system that existing parts can be used for such members. Then, the optical system body 2 desirably has such a construction that it can be removed readily from the lateral running beam 4. Further, if a shutter is provided for each of the stereo eyepieces 212 of the optical system body 2, then a measurer can make a measurement in a one-eye vision without closing one of the eyes thereof.

Further, for analysis of three-dimensional data, it is desirable to perform a single photograph standarization with a self calibration. Here, the self calibration denotes a method wherein a parameter indicative of a systematic error included in a coordinate of a photograph is treated as an unknown amount and is resolved together with external standarization factors in order to improve the accuracy. Further, for example, a position of the camera, an inclination of the camera and so forth correspond to such external standardization factors. Then, the single photograph standarization is used in order to find out external standarization factors, a self calibration and so forth making use of a set of photographs.

The stereoscopic photographic measuring device having such a construction as described above can be utilized not only for aerial photographic survey but also for measurement of a cultural property or measurement of a huge structure as well as three-dimensional measurement of a human body or the like and measurement of mechanical parts of the like. It is to be noted that a velocity of movement of a body can be detected by measuring a stereoscopic photograph at different timings. Accordingly, if a suitable minute substance is diffused in a water tank for experiment or the like and the velocity of movement of the substance is detected, then a flow rate distribution vector can be drawn simply and easily.

The present invention has been made in view of the subject described above, and according to the present invention, a stereoscopic photographic measuring device is characterized in that it comprises a table for receiving a set of stereoscopic photographs thereon, and an optical system body constructed for movement in two-dimensional directions relative to the table, that the table has a plane coordinate reading means provided thereon for reading coordinates of the stereoscopic photographs while the optical system body has provided thereon a stereoscope unit for observing the stereoscopic photographs in a stereoscopic vision, first and second cursors disposed within a range wherein the first and second cursors can be observed by way of the stereoscope unit, and a distance adjusting means for adjusting a distance between the first and second cursors, and that the stereoscopic photographic measuring device further comprises an outputting means for outputting data read in by the first cursor and the plane coordinate reading means and data read in by the second cursor and the plane coordinate reading means to a data processing device. Accoring to the present invention, a stereoscopic photographic measuring device is further characterized in that it comprises a table for receiving a set of stereoscopic photographs thereon, and an optical system body constructed for movement in two-dimensional directions relative to the table, that the optical system body has provided thereon a stereoscope unit for observing the stereoscopic photographs in a stereoscopic vision, first and second cursors disposed within a range wherein the first and second cursors can be observed by way of the stereoscope unit, a distance adjusting means for adjusting a distance between the first and second cursors, and a cursor distance detecting means for measuring the distance between the first and second cursors and converting the same into an electric signal, and that an output signal of the cursor distance detecting means can be outputted to a data processing device. Then, according to the present invention, a stereoscopic photographic measuring device is characterized in that it comprises a table for receiving a set of stereoscopic photographs thereon, and an optical system body constructed for movement in two-dimensional directions relative to the table, that the table has a plane coordinate reading means provided thereon for reading coordinates of the stereoscopic photographs while the optical system body has provided thereon a stereoscope unit for observing the stereoscopic photographs in a stereoscopic vision, and first and second cursors disposed within a range wherein the first and second cursors can be observed by way of the stereoscope unit, that the first cursor and the second cursor are constructed for movement independently of each other relative to the table, that the steresocopic photographic measuring device further coprises an outputting means for outputting data read in by the first or second cursor and the plane coordinate reading means to a data processing device, and that the outputting means includes a first switch means for selectively changing over data originating from the first cursor or the second cursor, a second switch means repsonsive to an external signal for alternately changing over the data originating from the first or second cursors, and a third switch means responsive to an external signal for outputting both of the data originating from the first and second cursors, and is constructed such that any one of the first, second and third switches can be selected.

According to the present invention having such a construction as described above, if a set of stereoscopic photographs are placed onto the table on which the coordinate reading means is formed and then the stereoscope unit provided on the optical system body is looked through, then the stereoscopic photographs can be observed in a steresocopic vision. Further, the optical system body on which the stereoscope unit and the first and second cursors are provided is constructed for movement in two-dimensional directions relative to the table and is disposed at a position at which the first and second cursors can be observed by way of the stereoscope unit. Then, the distance adjusting means can adjust the distance between the first and second cursors, and the first and second cursors are adjusted while observing the stereoscopic photographs in a stereoscopic vision by way of the stereoscope unit so that corresponding two-dimensional coordinates can be read by the plane coordinate reading means. Further, the outputting means can forward data read in by the first cursor and the plane coordinate reading means and data read in by the second cursor and the plane coordinate reading means to the data processing device. Further, according to the present invention, the distance adjusting means can adjust the distance between the first and second cursors, and the cursor distance detecting means can measure the distance between the first cursor and the second cursor and convert the same into an electric signal. And, the cursor distance detecting means can forward the thus coverted output signal to the data processing device. Further, according to the present invention, the first cursor and the second cursor are constructed for movement independently of each other relative to the table, and the outputting means includes three kinds of switch means. If the first switch means is selected, the data obtained from the first cursor or the second cursor and the plane coordinate reading means can be selectively changed over. Then, if the second switch means is selected, the data originating from the first and second cursors can be changed over alternately in response to an external signal. Further, if the third switch means is selected, both of the data originating from the first and second cursors can be outputted in response to an external signal.

According to the present invention having such a construction as described above, the stereoscopic photographic measuring device comprises a table for receiving a set of stereoscopic photographs thereon and an optical system body constructed for movement in two-dimensional directions relative to the table, and the table has a plane coordinate reading means provided thereon for reading coordinates of the stereoscopic photographs while the optical system body has provided thereon a stereoscope unit for observing the stereoscopic photographs in a stereoscopic vision, first and second cursors disposed within a range wherein the first and second cursors can be observed by way of the stereoscope unit, and a distance adjusting means for adjusting a distance between the first and second cursors, it being constituted from the first cursor and the plane coordinate reading means. Therefore, the stereoscope unti and the first and second cursors can be moved in an integral relationship. Accordingly, there is an effect that, if a set of stereoscopic photographs are placed so as to be observed in a stereoscopic vision, then even if the optical system body is moved to a desired point of measurement, there is no necessity of making an adjustment to realize a stereoscopic vision again. Further, since an outputting means for outputting data read in by the first cursor and data read in by the second cursor and the plane coordinate reading means to a data processing device is provided, either left or right two-dimensional coordinates can be read in simply and easily. Further, since a hand of a man or the like will not contact with the cursors and so on, there is an excellent effect that no blurring nor dislocation will take place. Further, the stereoscopic photographic measuring device according to the present invention comprises a cursor distance adjusting means for adjusting the distance between the cursors and a cursor distance detecting means for measuring the distance between the first and second cursors and converting the same into an electric signal, and an output signal of the cursor distance detecting means can be outputted to the data processing device. Accordingly, there is an effect that, even if the point of measurement is moved,f there is no necessity of performing an adjustment to realize a stereoscopic vision, and altitude difference and so forth can be measured sucessively. Further, there is an excellent effect tha, if the optical system body is moved above the stereoscopic photographs while maintaining the distance between the first and second cursors fixed, then a contour line can be drawn simply and easily. Further, since the first and second cursors in the present invention are constructed for movement independently of each other relative to the table, there is an effect that a user can move at least one of the cursors to a desired position. Then, since the outputting means is constructed so as to allow selection of three kinds of switch means, there is an effect that, if the first switch means is selected, then output signals of the plane coordinate reading means by the first cursor and the second cursor can be selectively changed over, and data originating from a desired one of the cursors can be read in freely. Then, if the second switch means is selected, there is an effect that the data originating from the first cursor 22 and the data originating from the second cursor 23 can be read in alternately in repsonse to an external signal such as of a foot switch, and coordinates of the phtotographs A and B can be read in efficiently. Further, if the third switch means is selected, there is an effect that both of the data originating from the first cursor 22 and the second cursor 23 can be read in automatically in response to an external signal such as of the foot switch and accordingly the efficiency is very high.

As apparent from the foregoing description, the present invention has an excellent effect that it can execute an analysis of a stereoscopic photograph very efficiently.

What is claimed is:

1. A stereoscopic photographic measuring device, characterized in that it comprises a table for receiving a set of stereoscopic photographs thereon, and an optical system body constructed for movement in two-dimensional directions relative to said table, that said table has a plane coordinate reading means provided thereon for reading coordinates of the stereoscopic photographs while said optical system body has provided thereon a stereoscope unit for observing the stereoscopic photographs in a stereoscopic vision, first and second cursors disposed within a range wherein said first and second cursors can be observed by way of said stereoscope unit, and a distance adjusting means for adjusting a distance between said first and second cursors, and that said stereoscopic photographic measuring device further comprises a switch means for selectively changing over data read in by said first cursor and said plane coordinate reading means and data read in by said second cursor and said plane coordinate reading means and outputting the same to a data processing device.

2. A stereoscopic photographic measuring device, characterized in that it comprises a table for receiving a set of stereoscopic photographs thereon, and an optical system body constructed for movement in two-dimensional directions relative to said table, that said optical system body has provided thereon a stereoscope unit for observing the stereoscopic photographs in a stereoscopic vision, first and second cursors disposed within a range wherein said first and second cursors can be observed by way of said stereoscope unit, a distance adjusting means for adjusting a distance between said first and second cursors, and a cursor distance detecting means for measuring the distance between said first and second cursors and converting the same into an electric signal, and that an output signal of said cursor distance detecting means can be outputted to a data processing device.

3. A stereoscopic photographic measuring device, characterized in that it comprises a table for receiving a set of stereoscopic photographs thereon, and an optical system body constructed for movement in two-dimensional dimensional directions relative to said table, that said table has a plane coordinate reading means provided thereon for reading coordinates of the stereoscopic photographs while said optical system body has provided thereon a stereoscope unit for observing the stereoscopic photographs in a stereosocpic vision, and first and second cursors disposed within a range wherein said first and second cursors can be observed by way of said stereoscope unit, that said first cursor and said second cursor are constructed for movement independently of each other relative to said table, that said stereoscopic photographic measuring device further comprises an outputting means for outputting data read in by said first or second cursor and said plane coordinate reading means to a data processing device, and that said outputting means includes a first switch means for selectively changing over data originating from said first cursor or said second cursor, a second switch means responsive to an external signal for alternately changing over the data originating from said first and second cursors, and a third switch means responsive to an external signal for outputting both of the data originating from said first and second cursors, and is constructed such that any one of said first, second and third switches can be selected.

* * * * *